US006226390B1

(12) United States Patent
Deruyter et al.

(10) Patent No.: US 6,226,390 B1
(45) Date of Patent: *May 1, 2001

(54) METHOD FOR MODELING THE PORE-SIZE DISTRIBUTION OF A POROUS SAMPLE OF VARIABLE POROSITY

(75) Inventors: Christian Deruyter; Jean-François Le Romancer, both of Rueil-Malmaison; Dominique Garnier, Orgeval, all of (FR)

(73) Assignee: Institute Francais du Petrole, Rueil-Malmaison cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/971,623

(22) Filed: Nov. 17, 1997

(30) Foreign Application Priority Data

Nov. 18, 1996 (FR) ...................................... 96 14126

(51) Int. Cl.[7] .............................. G06K 9/00; B31D 3/00; G01L 21/30; B44C 1/22
(52) U.S. Cl. .............................. 382/109; 216/56; 216/59; 216/65
(58) Field of Search .................................. 382/109; 73/38; 345/419, 420, 964; 364/474.24, 468.04; 216/34, 94, 56, 59, 65

(56) References Cited

U.S. PATENT DOCUMENTS

| 4,628,468 | * | 12/1986 | Thompson et al. | 702/12 |
|---|---|---|---|---|
| 4,783,751 | * | 11/1988 | Ehrlich et al. | 702/11 |
| 4,821,164 | * | 4/1989 | Swanson | 702/5 |
| 4,882,763 | * | 11/1989 | Buchan et al. | 382/109 |
| 5,146,086 | * | 9/1992 | De et al. | 250/253 |
| 5,354,414 | * | 10/1994 | Feygin | 216/34 |
| 5,698,772 | * | 12/1997 | Deruyter et al. | 73/38 |
| 5,809,163 | * | 9/1998 | Delhomme et al. | 382/109 |
| 5,828,981 | * | 10/1998 | Callender et al. | 702/6 |

* cited by examiner

Primary Examiner—Amelia Au
Assistant Examiner—Mehrdad Dastouri
(74) Attorney, Agent, or Firm—Antonelli, Terry, Stout & Kraus, LLP

(57) ABSTRACT

The pore-size distribution of a porous sample of variable porosity is modeled achievement of, allowing laboratory studies on the behavior of the medium modeled in relation to fluids. The porosity of the porous medium is modeled on one or more parting surfaces by means of a network (R) of intersecting channels (C) whose nodes form pores (P), the size of these channels showing physical properties of the medium and being selected from one or more discrete channel size distributions. In order to model the porosity of a heterogeneous sample exhibiting very different porosity zones, several discrete channel distributions are preferably used, these distributions being disjoint or not, and modeling with different zones, zones of low permeability and zones of higher permeability. The geometric model formed is transposed into a physical model by using for example a controlled laser from a predesigned geometric model in order to form, on a material reacting to the action of the light, a network of channels reproducing the porosity of the sample on one or more parting surfaces and to join them together. The method can be used notably for modeling of porous rocks taken from hydrocarbon reservoirs.

16 Claims, 2 Drawing Sheets

METHOD FOR MODELING THE PORE-SIZE DISTRIBUTION OF A POROUS SAMPLE OF VARIABLE POROSITY

BACKGROUND OF THE INVENTION

1. Field of the Invention

The present invention relates to a method for modeling the pore-size distribution of a porous sample of variable porosity allowing achievement of laboratory studies on the behavior of the medium modeled in relation to fluids.

2. Description of the Prior Art

A porous medium is made up of a solid structure (or matrix) comprising cavities or pores connected with each other by channels or which are isolated from each other. The pores can be empty or saturated with one or more fluids. There can be for example porous rocks such as sandstones or limestones containing fluids in the pores, notably hydrocarbons. These reservoir rocks can be defined with precision from specific physical quantities such as the porosity, the permeability, i.e. the aptitude for allowing circulation of fluids which they are saturated with, the wettability, the geometry and the connectivity of the pores, etc.

The porous rocks that are found in oil-bearing reservoirs notably have a heterogeneous structure with alternation of zones exhibiting a greater or lesser porosity and permeability. Heterogeneities appear in the form of strata or nodules on the reservoir scale. On the microscopic scale, the porous media exhibit a fractal structure which is translated into a continuous pore-size distribution.

U.S Pat. No. 4,882,763 describes a process for constructing a model representative of a porous medium consisting mainly in etching onto glass a network of pores whose configuration reproduces that of the pores of a porous rock. Transposition is achieved by forming a digitized image of the network of pores by projection of light through a thin section of rock, that is reproduced on the glass substrate by means of a photolithographic process with chemical attack.

The minimum diameter of the channels realizable with a photolithographic process with chemical attack is of the order of 0.15 mm, which limits the variety of channel sizes available. Furthermore, the depth of the channels is not very regular over the total width thereof and it is limited in practice to 0.2 mm. In practice, the width of the channels thus realized is greater than their depth. Consequently, when liquid is injected into the network, the capillary pressure is imposed by the thickness of the channels and not by the width thereof, as it would be desirable for the physical model to be really representative.

SUMMARY OF THE INVENTION

The process according to the invention has applications for modeling porous rocks taken from hydrocarbon reservoirs. Such a physical model allows laboratory observation of the hydrodynamic behavior of oil in the pores and determination of the most suitable method for displacing oil when it is trapped therein. A reservoir engineer can thus choose the best reservoir drive method.

The invention models the pore-size distribution of a porous sample of variable porosity by means of intersecting channels forming a network whose intersections constitute pores, the size of these channels representing physical properties of the medium and being selected from one or more discrete channel size distributions. The method models the porous medium on several different parting surfaces comprising each a network of channels, and the various networks of channels are interconnected so as to form a 3D geometric model.

At least two separated channel size distributions can for example be selected, one corresponding to micropores and being assigned to modeling of zones of lower porosity, the second being assigned to modeling of zones of higher porosity.

According to an embodiment, the geometric model modeling the sample in depth is translated into a physical model comprising several networks of channels communicating with each other, this physical model being made for example by means of a controlled laser from a predesigned 3D geometric model in order to form, on several different layers of a material reacting to the action of the laser light, networks of channels having the porosity of the sample on a parting surface and to form connections between the networks of the various layers.

Channels whose depth can be greater than their width are for example formed, which allows a greater or lesser flow rate to be obtained.

The invention also relates to a system for modeling the pore-size distribution of a porous sample of variable porosity, which is characterized in that it comprises modeling the porosity of the porous medium by means of several networks of intersecting channels whose nodes form pores, the size of these channels representing physical properties of the medium and being selected from at least one discrete channel size distribution, and an etching set for forming a 3D physical model by formation of the network on various layers of a substrate and by formation of communication channels between the networks.

The modeling may be preformed by a computer programmed to manage files representative of the networks of channels to be formed and to produce CAD files for controlling selected etching that may be a controlled laser.

BRIEF DESCRIPTION OF THE DRAWINGS

Other features and advantages of the method and of the system according to the invention will be clear from reading the description hereafter of a non limitative embodiment example, with reference to the accompanying drawings wherein.

DESCRIPTION OF THE PREFERRED EMBODIMENTS OF THE INVENTION

By using for example a mercury-injection porosimetry method, the pore size of an observed rock sample is classified by making a cut in the rock sample to be modeled along a plane. Histograms (FIG. 2) are produced from capillary pressure curves, by means of a discrete distribution, showing the percentage of appearance of each interconnection channel class of the pores as a function of the diameter thereof. The maximum percentage value corresponds to the pore class with the most widespread diameter. Heterogeneous structures have histograms with several distribution ranges representative of the matrix areas exhibiting different porosities.

Figure 1:
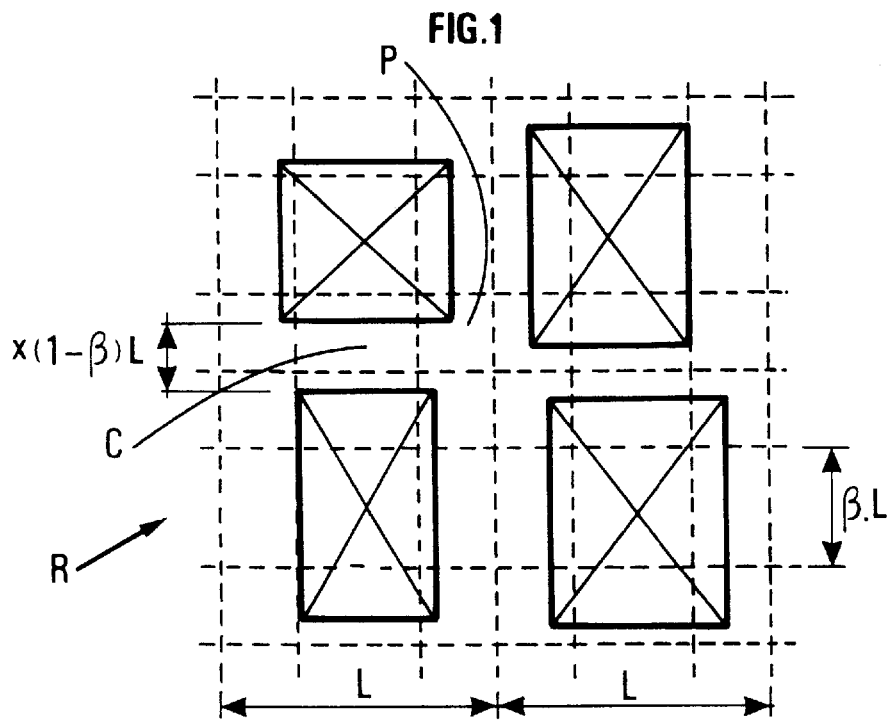
FIG. 1 diagrammatically illustrates the geometric modeling of the pores of a porous medium.

This discrete pore distribution is modeled by means of a plane grid pattern of constant thickness P and of uniform grid cell width (or pitch) L (FIG. 1) on which a network of parallel channels whose intersections or nodes form the pores are superposed, thus difining separated quadrilaterals (rectangles for example) representing the solid phase P. The pitch L of the network corresponds to the distance between two nodes. Each quadrilateral occupies a minimum fraction $\beta.L$ ($0<\beta<1$) of pitch L. The complementary fraction $(1-\beta).L$ between the quadrilaterals of the solid phase represents the maximum width of channels C where the fluids circulate. The average length of a connection joining two consecutive pores is also $\beta.L$ and its characteristic diameter (width) is written:

$$d=x.(1-\beta).L,$$

where L is the network pitch, $\beta$ the rate of occupation and x is a variable multiplicative coefficient characteristic of the size of the connection that is introduced to account for the real distribution of the pore diameters in a heterogeneous natural medium, which are most often below 1 $\mu$m in natural rock samples (chalk or sandstone).

Figure 2:
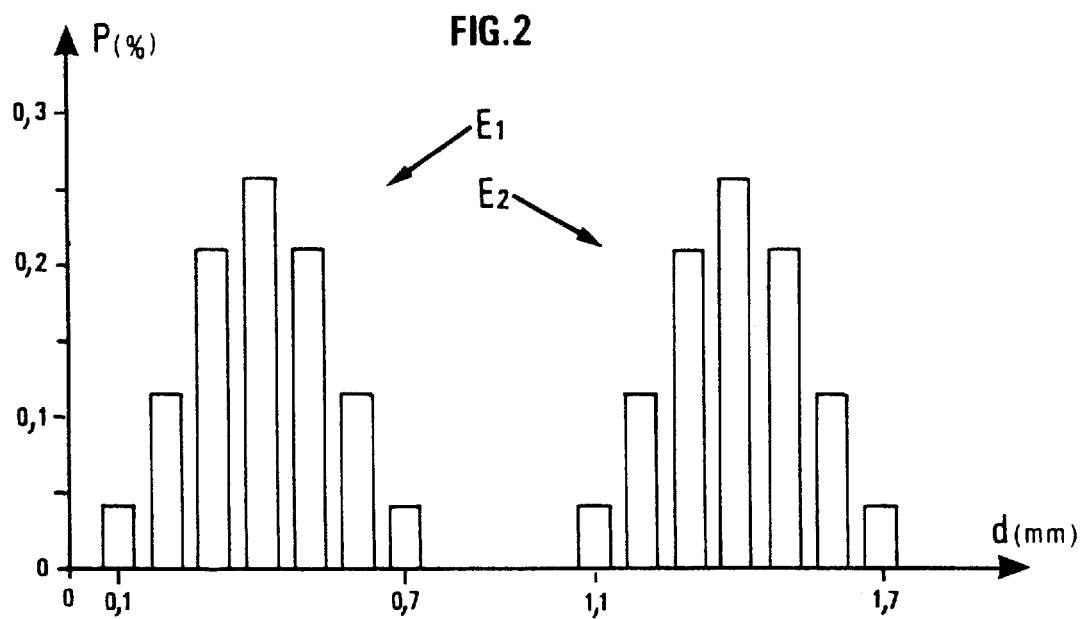
FIG. 2 illustrates a histogram representing distribution law examples of channel sizes in a porous medium.

This type of geometric modeling is implemented by translating the porosity (pore diameter and connectivity) in each zone of a heterogeneous sample into a pattern of quadrilaterals and channels whose dimensions are greater or and selected from one or more discrete size sets, each distributed in a given interval. FIG. 2 shows the occurrence probability (P %) of the channels within two separated size distributions d of the channels. The two size distributions E1, E2 of FIG. 2 are used. for example, the first for modeling micropores (size ranging between 0.1 and 0.7 mm for example) present in zones of lower porosity, and the second for macropores (size ranging between 1 and 1.7 mm for example) present in zones of higher porosity. The size distributions used (E1, E2 for example) can be separated without overlapping with a non zero interval d between them or with partial overlapping.

A random number generator allows assigning of a place in the network to each channel of fixed diameter. The various pore sizes are thus distributed randomly throughout the network, with an appearance sequence representative of the distribution law.

It is convenient to build up files comprising all the connection sizes to be distributed in the various parts of the physical model so that it reproduces the porosity distribution of the heterogeneous medium to be simulated as well as the coordinates of the various areas of low porosity. The following items are defined for each pore-size distribution:

the specific minimum and maximum diameters of each distribution,
the number n of pore diameter classes present in each distribution,
the dimensions of the network in two different directions, orthogonal for example,
the value of the pitch of the network of microporous pockets (multiple of the pitch of the matrix network),
the number of nodules of low porosity in the network, as well as the location and the extensions thereof.

The plane geometric model obtained reproduces the porosity of a sample cut along a cutting plane. However, it is possible to multiply the cutting planes and to translate the heterogeneous porosity of each one of them into a suitable plane model and to thus form a 3D geometric model showing the porosity of a sample in the depth thereof.

Figure 6:
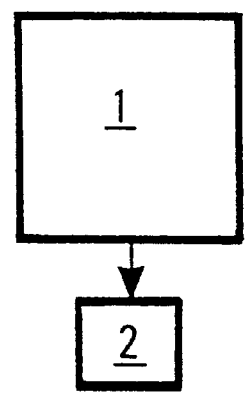
FIG. 6 illustrates a block diagram of the implementation system.

The physical model is achieved in practice by using (FIG. 6) a system comprising a computer 1 associated with various programs. A first one, written for example in Fortran, is used to generate a set of channel sizes in accordance with the form of the pore-size distribution determined experimentally. By means of a spreadsheet for example, a set of representative files is formed, from which a specialized software of a well-known type produces a 3D CAD version. The resulting files are then applied to a software controlling an etching system 2 suited to reproduce, on a solid substrate: glass, plastic material etc., a network of furrows or scratches corresponding to the predesigned geometric model.

According to a preferred embodiment, the etching system works by transferring onto resin, by means of a controlled laser, the geometric model or the various geometric models previously formed, from the CAD files. A controlled laser beam scans the surface of a resin bath according to the model to be reproduced. In the places reached by the beam, the resin hardens over a depth of about 100 $\mu$m. It is immersed in the bath so as to cover it with a film of resin that is scanned by the controlled laser in order to similarly draw another plane network thereon. By piling up successively impressed layers, a 3D physical micromodel is formed. This process allows forming any 3D structure of well-formed channels with an adjustable well-determined depth and width.

Figure 3:
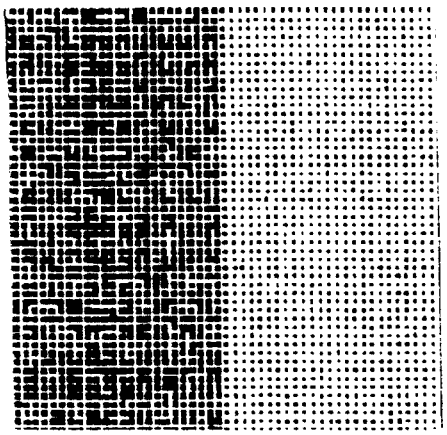
FIG. 3 illustrates an example of a physical model representative of two juxtaposed zones with different porosities.
Figure 4:
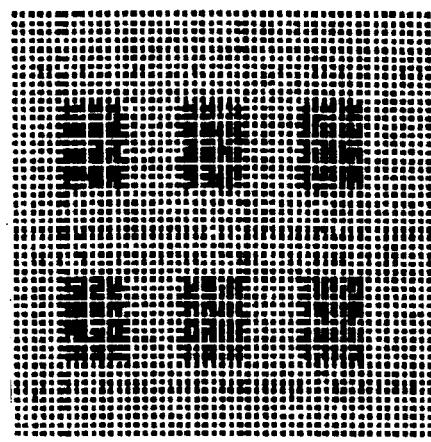
FIG. 4 illustrates another example of a physical model comprising several microporous nodules scattered in a network.
Figure 5:
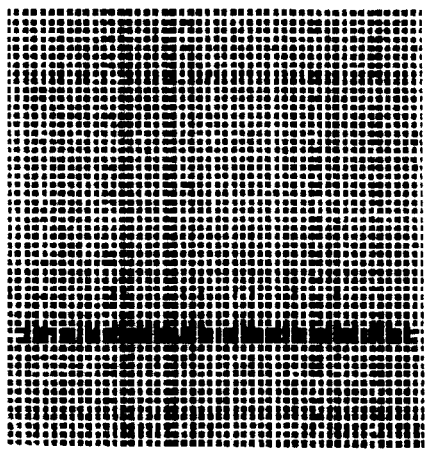
FIG. 5 illustrates another example of a physical model having a capillary barrier.

FIGS. 3–5 show networks that have been achieved with a 3-mm pitch, with microporous channels selected in the 0.1–0.7 mm range, and macroporous channels selected in the 1.1–1.7 mm range. Using a tool such as a laser also allows establishing interconnections in depth between plane networks of superposed channels, modeling the permeability of a sample in directions that are not parallel to the superposed networks. The 3D physical model thus obtained can also allow observation of the displacement of fluids in the thickness of a sample.

It is important to emphasize that channels whose depth can be greater than the width thereof are obtained with the process used. Thus, when fluids are injected into the physical model thus formed, the capillary pressure is governed by the width of the channels, which is in accordance with the objective of the invention.

What is claimed is:

1. A method for modeling a size distribution of pores of a porous sample of variable porosity, comprising:

translating pore sizes of a cut in a rock sample from capillary pressure curves into channels of a discrete distribution of channels having a depth and widths selected from at least one discrete channel size distribution; and forming on at least one layer of a substrate at least one rectangular grid of channels having intersections modeling pores having widths selected in the at least one discrete channel size distribution which models permeability of the porous sample.

2. A method as claimed in claim 1, wherein a plurality of layers are formed each of a different depth with at least one rectangular grid of the channels of the plurality of layers being interconnected.

3. A method as claimed in claim 2, further comprising selecting in the at least one predetermined discrete channel size distribution at least two separated channel size distributions for each rectangular grid of channels, a first size distribution corresponding to micropores and being assigned to modeling of zones of lower porosity and a second size distribution being assigned to modeling of zones of a higher porosity.

4. A method as claimed in claim 3, further comprising using a controlled laser beam for forming predesigned rectangular grids of channels respectively on different layers of different depths of a material reacting to the action of laser light, the rectangular grids of channels representing the porosity of the sample on one of the different layers and forming interconnections of the rectangular grids of the different layers.

5. A method as claimed in claim 4, comprising forming channels with a depth greater than a width thereof.

6. A method as claimed in claim 1, further comprising selecting in the at least one discrete channel size distribution at least two separated channel size distributions for each rectangular grid of channels, a first size distribution corresponding to micropores and being assigned to modeling of zones of lower porosity and a second size distribution being assigned to modeling of zones of a higher porosity.

7. A method as claimed in claim 6, further comprising using a controlled laser beam for forming predesigned rectangular grids of channels respectively on different layers of different depths of a material reacting to the action of laser light, the rectangular grids of channels representing the porosity of the sample on one of the different layers and forming interconnections of the rectangular grids of the different layers.

8. A method as claimed in claim 7, comprising forming channels with a depth greater than a width thereof.

9. A method for modeling a size distribution of pores of a porous sample of variable porosity, comprising:
   translating pore sizes of a cut in a rock sample from capillary pressure curves into channels of a discrete distribution of channels having a depth and widths selected from at least one discrete channel size distribution; and
   forming on each of a plurality of layers of a substrate at least one rectangular grid of channels having intersections modeling pores having widths selected in the at least one discrete channel size distribution which models permeability of the porous sample; and
   interconnecting the layers by interconnection of at least one rectangular grid of channels of each layer.

10. A method as claimed in claim 9, further comprising:
    selecting at least two separated channel size distributions for each rectangular grid of channels, a first size distribution corresponding to micropores and being assigned to modeling of zones of lower porosity and a second size distribution being assigned to modeling of zones of a higher porosity.

11. A method as claimed in claim 10, further comprising:
    using a controlled laser beam for forming predesigned rectangular grids of channels respectively on different layers of different depths of a material reacting to the action of laser light, the rectangular grids of channels representing the porosity of the sample on one of the different layers; and
    forming interconnections of the rectangular grids of the different layers.

12. A method as claimed in claim 11, comprising forming channels with a depth greater than a width thereof.

13. A method as claimed in claim 10, comprising forming channels with a depth greater than a width thereof.

14. A method as claimed in claim 9, further comprising:
    using a controlled laser beam for forming predesigned rectangular grids of channels respectively on different layers of different depths of a material reacting to the action of laser light, the rectangular grids of channels representing the porosity of the sample on one of the different layers; and
    forming interconnections of the rectangular grids of the different layers.

15. A method as claimed in claim 9, comprising forming channels with a depth greater than a width thereof.

16. A method as claimed in claim 14, comprising forming channels with a depth greater than a width thereof.

* * * * *